United States Patent

Schöller

Patent Number: 5,860,332
Date of Patent: Jan. 19, 1999

[54] INDEXING DEVICE

[76] Inventor: Felix Schöller, Muschelkalkweg 2, D-73760 Ostfildern, Germany

[21] Appl. No.: 793,137

[22] PCT Filed: Jul. 14, 1995

[86] PCT No.: PCT/EP95/02765

§ 371 Date: Feb. 19, 1997

§ 102(e) Date: Feb. 19, 1997

[87] PCT Pub. No.: WO96/06708

PCT Pub. Date: Mar. 7, 1996

[30] Foreign Application Priority Data

Aug. 31, 1994 [DE] Germany .......................... 44 30 897.3

[51] Int. Cl.⁶ .................................................... B23Q 16/06
[52] U.S. Cl. ............................................................ 74/813 L
[58] Field of Search .............................. 74/813 L, 813 R, 74/826

[56] References Cited

U.S. PATENT DOCUMENTS

| | | | |
|---|---|---|---|
| 3,797,333 | 3/1974 | Maier | 74/813 L X |
| 4,015,487 | 4/1977 | Pfister | 74/813 L |
| 5,682,658 | 11/1997 | Roseliep | 74/813 L X |

FOREIGN PATENT DOCUMENTS

| | | |
|---|---|---|
| 2628677 | 12/1977 | Germany . |
| 2721671 | 11/1978 | Germany . |
| 9102314 | 8/1992 | Germany . |
| 2041850 | 2/1990 | Japan . |

*Primary Examiner*—Charles A. Marmor
*Assistant Examiner*—Mary Ann Battista
*Attorney, Agent, or Firm*—Roylance, Abrams, Berdo & Goodman, L.L.P.

[57] ABSTRACT

An indexing device has a first crown gear arranged on a first annular body secured to an indexing table, a second crown gear arranged on a second annular body secured to a housing, and a third crown gear arranged on an axially movable third annular body. The third crown gear can be taken out of and into engagement with the other annular crown gears by a hydraulically operable lifting and lowering device. A radial bearing supports the indexing table rotatably on the housing. The lifting device has one lifting piston which is fitted to move axially inside the housing and operates with the third crown gear. The lowering device can be hydraulically operated and has at least one hollow chamber which can be filled with fluid and is bounded on the one hand by the third crown gear. A fourth annular body engaged in an annular groove in the third annular body forms a guide for moving the third crown gear. This indexing device is compact, economical to produce, easy to fit and maintain and reliable in operation.

10 Claims, 3 Drawing Sheets

INDEXING DEVICE

FIELD OF THE INVENTION

The present invention relates to an indexing device with a first crown gear arranged on a first annular body connected with an indexing table, with a second crown gear arranged on a second annular body connected with a stationary housing, and with a third crown gear arranged on an axially slidable third annular body. The third crown gear can be brought into and out of engagement with the first and second annular crown gears by means of a hydraulically operable lifting and lowering device. A radial bearing supports the indexing table rotatably on the housing. The lifting device incorporates at least one lifting piston, which is supported axially movably within the housing and cooperates with the third annular body.

BACKGROUND OF THE INVENTION

In an indexing device, such as disclosed in Japan A-2 041 850, the fourth annular body exclusively along its exterior periphery forms a guide for the longitudinally slidable third annular body. The known lifting and lowering device used at this point has two hollow chambers separated from one another by the fourth annular body and filled alternately with liquid. In the case of this known arrangement, hydraulically controllable separate lifting pistons are used exclusively. Because of such pistons, the indexing device is of large structural dimensions. Also, this arrangement provides non-optimum flux of force. With the lifting of the third annular body for the purposes of engagement and mating of the crown gears with one another, a favorable moment of force arises as a result of the offset of the third annular body projecting out further than the crown gears.

An indexing device is disclosed in German 26 28 677 C2 wherein the radial bearing of the indexing table is arranged between the two coaxial first and second annular bodies. Each annular body is provided with respectively first and second crown gears. Compared with the devices known until this time, the rotation factor error of this indexing table is decreased. Thus, the annular bodies supporting the crown gears in turn can be configured as supporting bodies and are manufactured with great precision on their bearing surfaces. Precise manufacturing of these rings is also required with regard to the crown gears provided on these annular bodies. The parts required for precision of rotation are to be accommodated in a narrow construction space. Since the annular bodies with their crown gears are manufactured precisely, the precision of the relevant parts and the rotation precision of the indexing table are, for the most part, guaranteed.

With the known arrangement, in order to slide the axially slidable third annular body axially upwardly and consequently to disengage its third crown gear from the two other crown gears of the other annular body, lifting pistons of a hydraulically operable lifting device are arranged in the housing of the indexing device around the periphery at predeterminable defined distances from one another. The lifting pistons undertake the decoupling or disconnecting process from the center, controlled by an auxiliary attachment. For the lowering process and consequently for bringing the crown gears, which in this case are called "Hirth gearings", into engagement with one another, the lifting pistons of the lifting device are made pressureless. A disk spring set engages on the relevant lifting piston and takes over the axial resetting movement. With the force of the spring set, the engagement of the third crown gear of the third annular body with the other crown gears is secured for further operation of the switching device.

This type of structural arrangement requires a plurality of lifting pistons and disk spring sets in the housing. The hydraulic control, including the necessary casing or lining, is costly. Furthermore, the lifting and lowering device in the known indexing devices is incorporated in the housing. Raising of the indexing table from the device by means of a lifting tool or the like for maintenance and assembly procedures is achievable only with great difficulty, which also increases the concomitant costs.

An alternative type of indexing table device, disclosed in German 21 37 698 C3, has a lowering device which is hydraulically operable, and, for this purpose, has hollow chambers which can be filled with liquid. The hollow chambers are arranged at the end of the third annular body incorporating the third crown gear, and are controlled and filled with liquid alternately to bring the third crown gear in or out of engagement with the two other crown gears for fastening and release of the indexing table. Consequently, with this known indexing device, a hydraulically controllable separate lifting piston is used exclusively. For the lifting of the third annular body with the third crown gear, the liquid pressure on the third annular body works on this body eccentrically and in addition to the crown gears. Also, with lowering of the third annular body, a nonuniform liquid pressure arises and works on it. This leads to lower the maximum power flux. The "backfilling" arising as a result of the nonuniform introduction of force between the annular bodies with their crown gears and tolerance compensation thus becoming required is attained by dividing the third annular body into two partial rings. The partial rings in turn are provided with a third crown gear and are connected with one another through an elastically flexible intermediate element. Because this intermediate element is subjected to corrosion or attrition, the rigidity required for reliable operation of the lifting and lowering device is lost. Also, the required mating precision of the crown gears fitting into one another for securing the indexing device is not guaranteed. Therefore, the lifting and lowering device of this known indexing device is of complicated construction and is accessible only with difficulty for maintenance and assembly.

SUMMARY OF THE INVENTION

Objects of the present invention are to provide an indexing device which is of small construction, of lower manufacturing and assembly and maintenance cost and is secure in operation.

The foregoing objects are basically obtained by an indexing device, comprising a stationary housing and an indexing table rotatably supported on the stationary housing by a radial bearing. A first crown gear is arranged on a first annular body connected to the indexing table. A second crown gear is arranged on a second annular body connected to the stationary housing. A third crown gear is arranged on an axially slidable third annular body. The third annular body is movable between a first position in which the third crown gear engages the first and second crown gears and a second position in which the third crown gear is disengaged from the first and second crown gears. A hydraulically operable lifting and lowering device moves the third annular body between the first and second positions. The lifting and lowering device includes a first hollow chamber, and a first lifting piston. The hollow chamber is defined between the third annular body and a stationary fourth annular body and is fillable with a liquid. The fourth annular body is engaged in a groove in the third annular body to guide movement of the third annular body between the positions thereof. The lifting piston is axially movably mounted within the housing and cooperates with the third annular body.

The resulting lifting and lowering device needs to be provided along the radial periphery dependent upon the dimensions of the indexing device now at only a few points. In addition to having a simplified hydraulic control arrangement for the indexing device, the number of parts is reduced, lowering manufacturing costs and decreasing assembly and repair costs. The hydraulically operable lifting and lowering device requires minimal structural space, and consequently, can be arranged in the area of the bottom of the indexing table, so that the movable parts of the lifting and lowering device remain on top of the housing during the lifting process and are easily accessible from all sides. Since fewer parts are in use, which also work essentially without wear, compared to the solutions known until this time in this are of technology, the overall security of operation is increased.

As a result of the center guiding of the third annular body along the fourth annular body, a very rigid construction is guaranteed with optimum flux of force. The central force introduced in the middle by means of the liquid pressure, with lowering of the third annular body, uniformly effects the crown gears in engagement with one another. The required tolerances are obtained without use of flexible intermediate members, which contributes to the operational security of the indexing device according to the present invention. As a result of the relevant lifting piston, optimum introduction of force can likewise be centered and the disconnection or decoupling step of the crown gears can likewise be attained.

In the case of one preferred embodiment of the indexing device according to the present invention, this optimal introduction of force is still further favored in that the three crown gears are covered and sealed off by the third annular body and are flush with the third annular body. The liquid flow produced in the hollow chamber, as well as the piston pressure of the lifting piston, are exerted centrally between the three crown gears extending on these bodies.

In another preferred embodiment of the indexing device according to the present invention, to produce cooperation of the lifting piston with the third annular body, an operating member controlling the lifting piston penetrates the second annular body to engage the third annular body. A tight mechanical connection between the operating part and the third annular body is avoided. This contributes to the ease of assembly and service, and at the same time, guarantees effective lifting of the third annular body by means of the lifting piston.

In another preferred embodiment of the indexing device according to the present invention, the fourth annular body is tightly connected with the housing around the assembly by a plurality of separator bolts distributed around its exterior periphery. Each separator bolt is at least partially surrounded by the third annular body and is contained therein. Because of these separator bolts, which are tightly connected with the housing, a secure fixing of the annular body in the radial notch in the indexing table is realized by their fitting in the radial cutouts in the indexing table. Thereby, a rigid guide for the third annular body is attained, so that the crown gears are defined in their dimensions and placement, and can be brought into engagement with one another without play at the interface.

Other objects, advantages and salient features of the present invention will become apparent from the following detailed description, which, taken in conjunction with the annexed drawings, disclose a preferred embodiment of the present invention.

BRIEF DESCRIPTION OF THE DRAWINGS

Referring to the drawings which form a part of this disclosure.

DETAILED DESCRIPTION OF THE PREFERRED EMBODIMENTS

Figure 1:
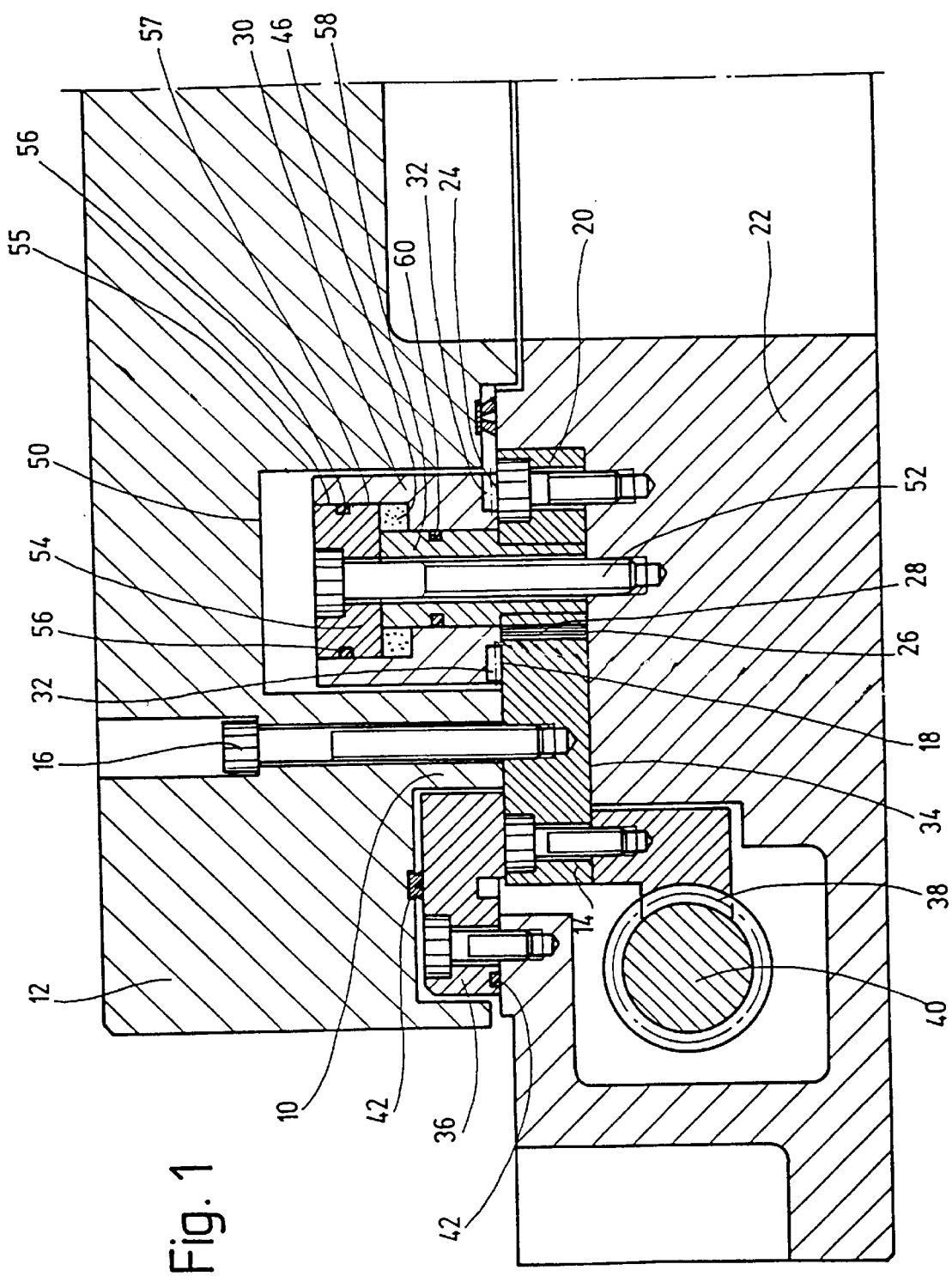
FIG. 1 is a side elevational view in section of an indexing device according to the present invention.

A first annular body 14 is fastened to an annular projection 10 in FIG. 1. Projection 10 extends axially from an indexing table 12, so that annular body 14 engages like a lamina on annular projection 10. Screws 16 are provided for the required fastening. Pins (not shown) serve for the positioning of these parts relative to one another. First annular body 14 supports a first crown gear 18 on its top in the area of its inside edge. Coaxial to first annular body 14, a second annular body 20 is arranged and rests in a cutout of housing 22 of the device. Second annular body 20 supports a second crown gear 24 on its top. Crown gears 18 and 24 lie in one and the same plane, and have identical numbers of gear teeth. The gear teeth of the two crown gears 18 and 24, in turn, are arranged to lie radially one behind the other. Between the two annular bodies 14 and 20, rolls 28 are arranged in a cage 26. Together with the cylindrical surfaces of the two annular bodies 14 and 20, these rolls 28 form the radial mounting for the indexing table 12.

Above the two annular bodies 14 and 20, a third annular body 30 is arranged. The side of the third annular body turned toward the two annular bodies 14 and 20 supports a third crown gear 32 with two associated gear trains configured to associate with the two crown gears 18 and 24. Annular body 14 is mounted on a flat bearing 34 in housing 22. It is secured against lifting from its bearing 34 by retaining ring 36, which is fastened to housing 22 and laps over the exterior edge of annular body 14. A face gear 38 is fastened to the bottom of first annular body 14 in the area of its exterior edge. Face gear 38 mates with a worm gear 40 driven by a motor (not shown) on both sides. The worm gear is mounted rotatably in housing 22.

Bearing 34 can incorporate a annular lubricating groove (not shown). Another annular lubricating groove (not shown) can be integrated into retaining ring 36 on its part overlapping annular body 14. Furthermore, gaskets can be provided between indexing table 12 on the one hand and retaining ring 36 or housing 22 on the other hand. Third annular body 30 with its third crown gear 32 can be brought out of or into engagement with the other annular crown gears by means of the lifting and lowering device indicated in its entirety in FIG. 2 as 44. Third annular body 30 is arranged in a radial cutout 50 in indexing table 12 and has a hollow chamber 46. A fourth annular body 54 is mounted within and is encircled by third annular body 30 (FIG. 1), and is tightly or fixedly connected with housing 22 by means of screw 52. In this manner, fourth annular body 54 has gaskets 56 along its interior and exterior periphery. The gaskets are in sealed engagement with the side walls of a surrounding annular groove 57 of third annular body 30. Fourth annular body 54, as shown particularly in FIG. 1, is connected securely by several cylindrical separator bolts 58, distributed along its closed exterior periphery and having screws 52 passing through them, with housing 22. Fourth annular body 54 and the relevant separator bolt 58 are at least partially surrounded by third annular body 30 and are held in this member.

Figure 3:
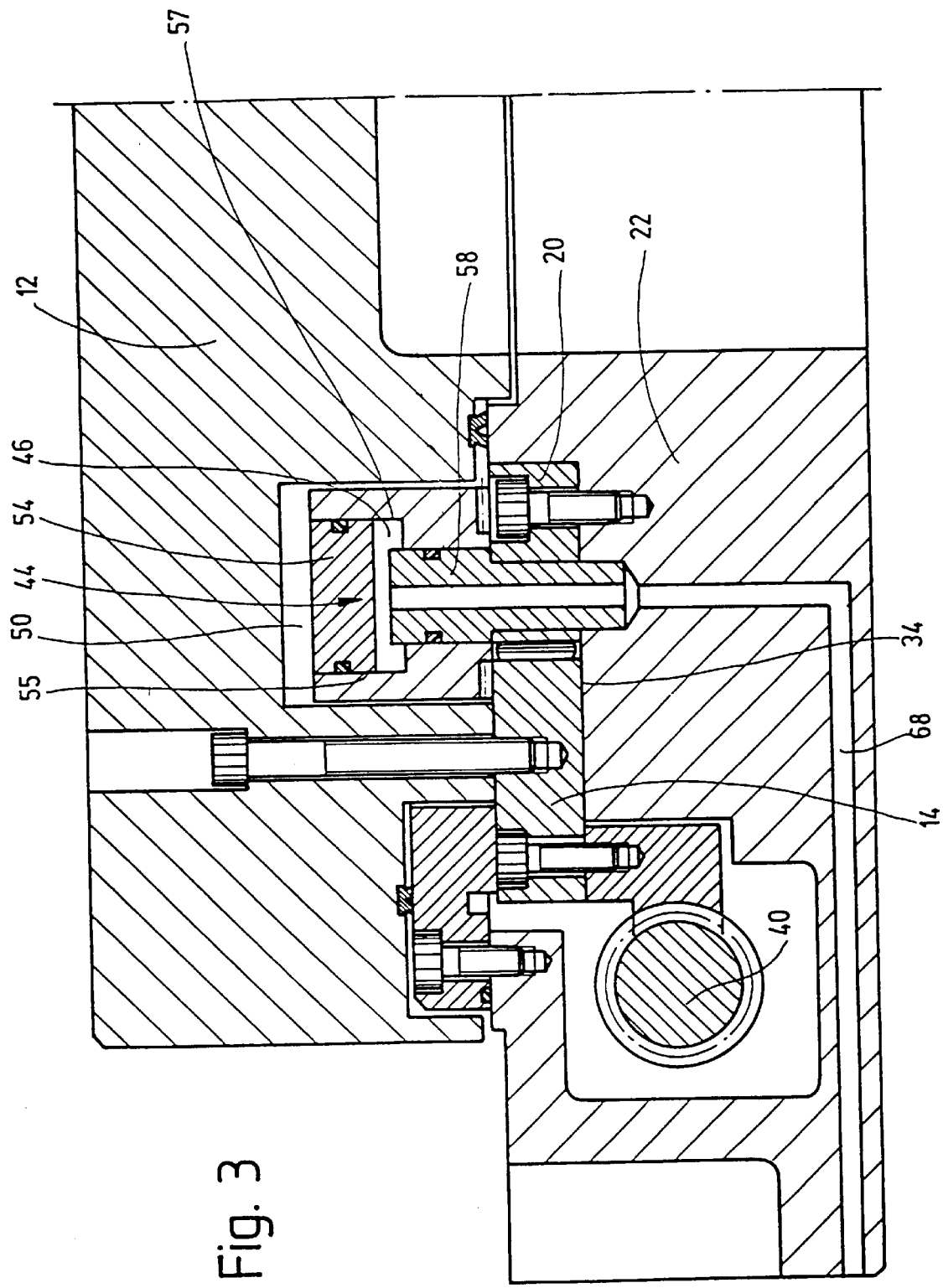
FIG. 3 is a further side elevational view in section of the indexing device of FIG. 1.

Third annular body 30 is guided axially movably along the separator bolt 58 along another interior guide 56. In each movement setting of third annular body 30, gasket 60 of separator bolt 58 engages to provide the connection of that screw 52, which holds fourth annular body 54 at some distance from housing 22. Connected with this housing 22, screw 52 penetrates the relevant associated cylindrical separator bolt 58, with a tapering extension penetrating second annular body 20. Third annular body 30, which becomes larger in its interior breadth in steps upward, according to the representation of FIG. 1, and together with annular body 54 and separator bolt 58, surrounds the hollow space 46. Hollow space 46 forms a sort of annular passage and is connected to a hydraulic feed and discharge conduit 68 (FIG. 3). Hollow space 46 passes both in front of and behind the penetration area of that separator bolt 58.

Figure 2:
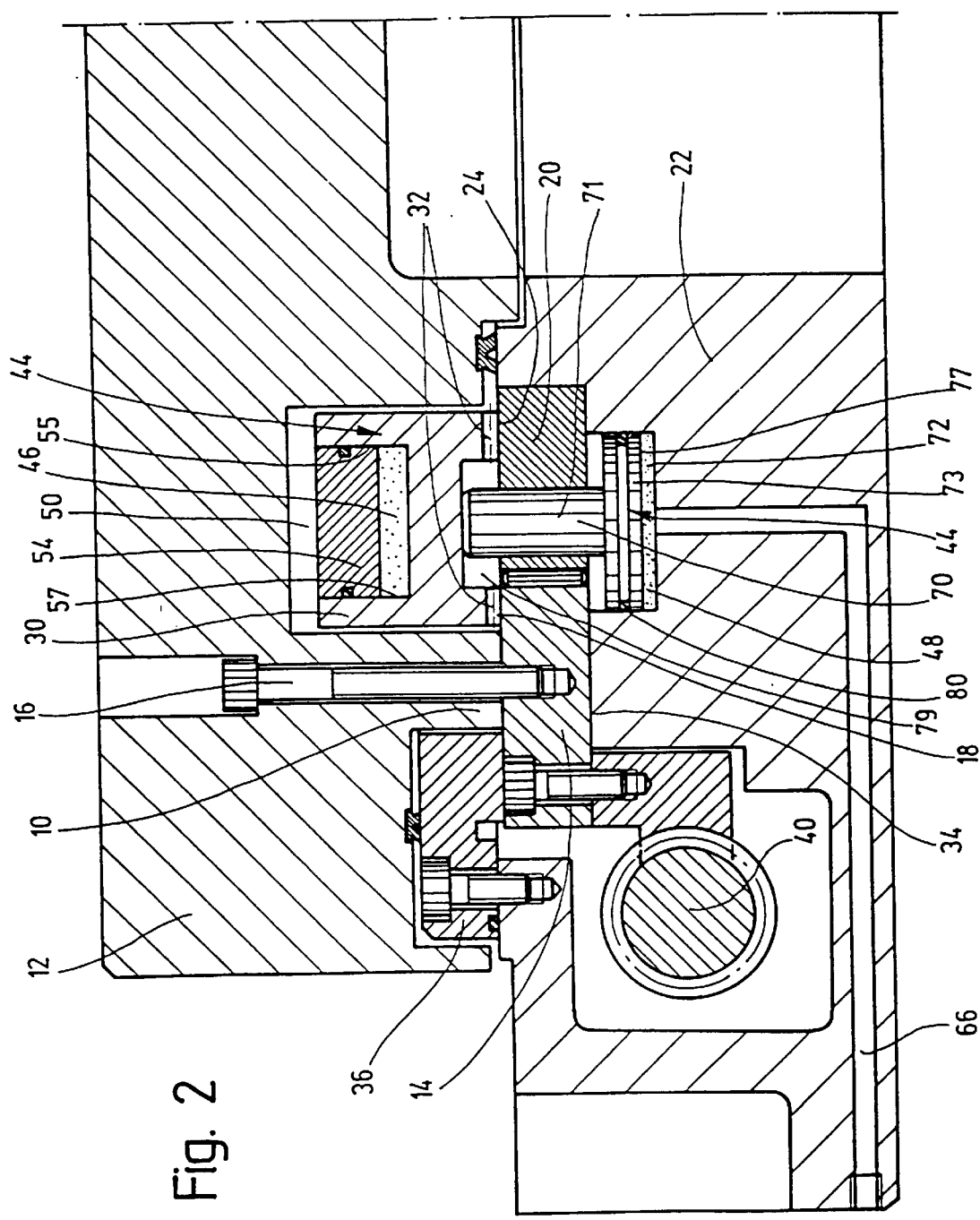
FIG. 2 is another side elevational view in section of the indexing device of FIG. 1.

A liquid is provided in the first hollow space 46 through liquid feed and discharge conduit 68, as shown in FIG. 3, which, as compared with the representations of FIGS. 1 and 2, incorporates an identical longitudinal section through the device circumferentially or angularly offset by approximately 20 degrees. Conduit 68 passes through another and associated separator bolt 58 and opens at its free end into hollow space 46. With smaller indexing devices, a lifting and lowering device 44 with a liquid feed and discharge conduit will usually suffice for the first hollow chamber 46. With devices of larger dimensions, a plurality of conduits driven with hydraulic oil, as well as lifting and lowering devices, can be present around the periphery of the indexing table. From a central point outward, there can be only a few structural parts for the lifting and lowering process.

As shown particularly in FIG. 2, third annular body 30 is pressed downward under the effect of the pressure medium in first hollow chamber 46 and locks the two crown gears 18 and 24 in the position of FIG. 2 by means of first annular body 14 and second annular body 20 cooperating with one another. Release of this locking setting occurs through third annular body 30 together with a lifting piston 70. The lifting and lowering device, indicated in its entirety as 44, is guided axially longitudinally movably in second annular body 20 and with its widened flange or pressure surface 77 in a radial cutout 72 in housing 22. Beneath pressure surface 77 is another second hollow chamber 48. Chamber 48 is limited by radial cutout 72 and the bottom of lifting piston 70 in a sealed arrangement, and is connected to another feed and discharge conduit 66 providing hydraulic oil. If first hollow chamber 46 is made pressureless and second hollow chamber 48 is fed a pressurized medium, third annular body 30 is raised with its third crown gear 32 to disengage the respective crown gears from one another, so that indexing table 12 can be rotated around its center rotary axis. Lifting and lowering device 44 shown in FIG. 2 can be present only once in the case of smaller indexing devices. Often, in the case of larger devices, third annular body 30 can raise and lower as an entirety or in not shown individual segments arranged uniformly around the radial periphery of the device.

Fourth stationary annular body 54 forms the guide 55 along its interior and exterior periphery for thrusting third annular body 30, and engages in annular groove 57 of third annular body 30. Furthermore, crown gears 18, 24 and 32 are covered by third annular body 30 and are sealed flush with this. The liquid pressure can be produced in hollow chamber 46 as well as the piston pressure of lifting piston 70, and has an effect between the three crown gears 18, 24 and 32 running thereon. For the cooperating of lifting piston 70 with third annular body 30, an operating part 71 of lifting piston 70 penetrates second annular body 20 and contacts the bottom of third annular body 30. Third annular body 30 is provided in this area with a radial cutout 79 so that in transverse section, as shown in FIG. 2, third annular body 30 has the shape of an "H" in the area of the relevant lifting piston 70. Operating part 71 is reduced in diameter as compared with the bottom piston part 73 with pressure surface 77. Piston part 73, which is consequently widened in diameter, has a gasket 80 on the exterior periphery, which seals the other hollow chamber 48 from the environment and the passage from housing 22 to indexing table 12.

If crown gears 18, 24 and 32, as shown in FIG. 2, are in engagement with one another, the top of fourth annular body 54 seals flush with the top of third annular body 30. According to the representations in FIGS. 1 and 3, the otherwise essentially U-shaped section of third annular body 30 allows for another middle-centered longitudinal guiding through cutouts adapted corresponding to separator bolts 58 in its bottom.

While a particular embodiment has been chosen to illustrate the invention, it will be understood by those skilled in the art that various changes and modifications can be made therein without departing from the scope of the invention as defined in the appended claims.

What is claimed is:

1. An indexing device, comprising:

a stationary housing;

an indexing table rotatably supported on said stationary housing by a radial bearing:

a first crown gear arranged on a first annular body connected to said indexing table;

a second crown gear arranged on a second annular body connected to said stationary housing;

a third crown gear arranged on an axially slidable third annular body, said third annular body being movable between a first position in which said third crown gear engages said first and second crown gears and a second position in which said third crown gear is disengaged from said first and second crown gears; and a hydraulically operable lifting and lowering device for moving said third annular body between said first and second positions, said lifting and lowering device including a first hollow chamber and a first lifting piston, said first hollow chamber being defined between said third annular body and a stationary fourth annular body and being fillable with a liquid, said fourth annular body being engaged in a groove in said third annular body to guide movement of said third annular body between said positions thereof, said lifting piston being axially movably mounted within said housing and cooperating with said third annular body.

2. An indexing device according to claim 1 wherein said third annular body is arranged in a radial cutout in said indexing table; and said first and second annular bodies are coaxial with said crown gears arranged thereon being coplanar and having identical numbers of gear teeth, said gear teeth of said first and second crown gears being radially aligned.

3. An indexing device according to claim 1 wherein said lifting piston comprises an operating part which penetrates said second annular body to engage said third annular body.

4. An indexing device according to claim 1 wherein said fourth annular body is securely connected to said housing by separator bolts distributed about an exterior periphery of said housing; and each of said separator bolts is at least partially surrounded and held by said third annular body.

5. An indexing device according to claim 1 wherein said lifting and lowering device comprises a second hollow chamber which can be filled with liquid;

whereby alternatively filling and emptying the respective hollow chambers causes said third annular body to move to said first and second positions.

6. An indexing device according to claim 1 wherein several of said lifting pistons are arranged around said third annular body in segments circumferentially spaced from one another.

7. An indexing device according to claim 1 wherein said first, second and third crown gears are covered by said third annular body; and liquid pressure in said hollow chamber and said lifting piston operate on a central portion of said third annular body between said crown gears.

8. An indexing device according to claim 7 wherein said lifting piston comprises an operating part which penetrates said second annular body to engage said third annular body.

9. An indexing device according to claim 8 wherein said lifting and lowering device comprises a second hollow chamber which can be filled with liquid;

whereby alternatively filling and emptying the respective hollow chambers causes said third annular body to move to said first and second positions.

10. An indexing device according to claim 9 wherein said lifting piston comprises a piston part of wider diameter than said operating part, said piston part being exposed in said second hollow chamber and forming a pressure surface on which force from liquid in said second hollow chamber is applied.

* * * * *